(12) United States Patent
Enfors et al.

(10) Patent No.: US 6,243,183 B1
(45) Date of Patent: Jun. 5, 2001

(54) METHOD AND EQUIPMENT FOR OPTICAL COMMUNICATION

(75) Inventors: Lars-Erik Enfors, Vällingby; Gunnar Stefan Forsberg, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/155,199

(22) PCT Filed: Mar. 20, 1997

(86) PCT No.: PCT/SE97/00476

§ 371 Date: Dec. 28, 1998

§ 102(e) Date: Dec. 28, 1998

(87) PCT Pub. No.: WO97/36389

PCT Pub. Date: Oct. 2, 1997

(30) Foreign Application Priority Data

Mar. 25, 1996 (SE) .................................................. 9601129

(51) Int. Cl.[7] .................................................. H04B 10/06
(52) U.S. Cl. .......................... 359/189; 375/345; 359/194; 359/195
(58) Field of Search .................................. 359/161, 194, 359/195; 375/345, 316, 317, 318; 327/165, 167

(56) References Cited

U.S. PATENT DOCUMENTS

| 4,257,125 | 3/1981 | Theall, Jr. . | |
|---|---|---|---|
| 4,996,529 | 2/1991 | Connell . | |
| 5,864,591 | * 1/1999 | Holcombe | 375/345 |
| 6,057,794 | * 5/2000 | Takamuki | 341/143 |
| 6,081,362 | * 6/2000 | Hatakeyama et al. | 359/189 |
| 6,094,463 | * 7/2000 | Stephens et al. | 375/326 |
| 6,118,831 | * 9/2000 | Masumoto et al. | 375/340 |

FOREIGN PATENT DOCUMENTS

0624009A1    11/1994 (EP) .

* cited by examiner

*Primary Examiner*—Leslie Pascal
*Assistant Examiner*—Dalzid Singh
(74) *Attorney, Agent, or Firm*—Burns, Doane, Swecker & Mathis, L.L.P.

(57) ABSTRACT

The present invention relates to a method and an arrangement for the automatic compensation of a DC-level for an incoming signal (IN) converted into an electrical form for the decision threshold level of binarizing limiter (3) in a fibre optic receiver. From the input signal (IN) converted to an electrical form, a comparison signal (INT) is subtracted, whereupon the signal is binarized by the signal limiter (3). Out of the binarized signal (S), a data regeneration circuit (6) generates the most probable transmitted signal. Based on the so achieved output signal (UT) and the binarized signal (S), a difference signal (D) is formed in a difference signal former (4). This is integrated in an integrator (5) and fed back to the limiter's (3) input for the comparison signal (INT). In this way, offset voltages are compensated for. At the same time, account is taken of the true pulse quotient of the incoming optical signal (O).

28 Claims, 4 Drawing Sheets

METHOD AND EQUIPMENT FOR OPTICAL COMMUNICATION

TECHNICAL FIELD

The invention relates to a device and a method for compensation of offset voltages during reception of a fibre optical signal.

STATE OF THE ART

Today's optical fibres have extremely small dispersion in relation to the light absorption in the fibre. This means that the optical signal in a receiver is characterized by extremely small distortion of the pulse shape. On the other hand, the signal amplitude is often extremely small. After conversion to the electrical form with the help of a light detector, e.g., a PIN-diode (Positive Intrinsic Negative), the signal amplitude is often as low as 5 mV and often superimposed on a direct current level of several volts. These low signal levels must be compared with the maximal specified offset voltage for e.g. a differential amplifier which normally is up to approximately 20 mV. In the case that the offset voltage is much higher than the signal amplitude, an extremely accurate offset compensation is required, and as the offset voltage is also temperature-dependent, an exact compensation is difficult to realize without the receiver being placed in an oven for constant temperature conditions. Such an arrangement should naturally be avoided as much as possible.

Another problem is the superimposed DC-level which the signal exhibits. It is not desirable to use an AC-coupling capacitor if an integrated manufacturing of the receiver circuit is desired, because the capacitor in general must be realized in a discrete process because capacitors with high capacities are difficult to realize in integrated designs because of their space requirements. Furthermore, even with an ideal AC-coupling there can only be achieved a zeroing of the time-average value of the signal. This average value only corresponds to a threshold level which lies in the middle between the high and low level of the signal when the transmitted signal exhibit a perfect pulse quotient of 50%, i.e., when the transmitted signal has exactly equal amounts of high symbols as low symbols in the signal. By pulse quotient in this connection is meant the number of high signals in the average in relation to the total number of symbols for a binary signal.

In the case where the pulse quotient continuously or more temporarily deviates from 50%, this threshold level will deviate from the zero level. This means that the signal after AC-coupling will show a certain displacement which, if this displacement is not compensated for, leads to reduced receiver sensitivity. For e.g. FDDI, Fibre Distributed Data Interfaces, which are ring-shaped high speed LAN/MAN-nets, a so-called 4B5B-code is used where the pulse quotient can vary between 40 and 60 percent. A pulse quotient of 40 percent means that the signal shows a DC-component of 40 percent of the signal's peak-to-peak value. This means that if a FDDI-signal is AC-coupled, the level which lies in the middle between the high and low level of the signal will be displaced 10 percent in relation to the idea level. This implies a reduction of the sensitivity of the receiver by theoretically about 1 dB.

For fibre optic signal transfer normally two level signals, i.e. binary signals, are used with some form of coding, such as e.g. 4B5B or Manchester-coding. In this way, a signal is achieved out of which the clock frequency is comparatively easy to extract.

Signal limiters which binarize the signal are normally used in fibre optic receivers, as this gives a relatively simple circuit solution for two-level signals, where the signal ideally only can attain two distinct levels. A further reason is that limiting can reduce the loss effects in the receiver, often up to 50 percent. Such a reduction of the loss effects can even itself contribute to a simpler implementation thanks to a reduced cooling requirement.

The problem of eliminating a DC-level on an incoming signal has earlier been solved for electrical signals. The American Patent Specification U.S. Pat. No. 4,966,529 solves such a problem, which might seem to be close to the above problem stated for fibre optical signals. U.S. Pat. No. 4,996,529 presents a technique intended for signal coding, such as analogue-digital converting, for the compensating of superimposed low frequency voltages. The circuit presented limits an analogue-electrical input signal and contains a feedback loop which in real time compensates for the DC-level of the input signal and adjusts the direct voltage level on the input signal to a limiter comprised in the circuit. Through sampling the limited signal with a large frequency in relation to the band width of the input signal, and accumulating the result, the limited signal is digitally integrated, whereafter it is fed back to the input of the limiter. In this way a negative feedback is achieved which implies an adjustment of the input signal of the limiter so that the output signal of the limiter attains the high signal level during an equally large amount of time as it attains the low level.

Oversampling of the signal requires that a clock signal is generated at a high frequency in relation to the signal which, because of the thereby resulting loss effects, reduces the field of use for the technique to low-frequency signals, such as speech signals.

It must, however, be obvious for the skilled person that the basic idea in the above described patent document in principle is applicable even to receivers for fibre optic signal transfer. In analogy with the above described technique, in this case an incoming signal converted to an electrical form is limited, and thereafter integrated and fed back to the limiter in such a way that the level on the fed back signal is adapted to the DC-level of the input signal so that this is compensated. In this way not only will the possible superimposed DC-voltage on the signal be compensated for, but also the offset voltage of the limiter.

This technique functions perfectly for signals where the pulse quotient is 50 percent. However, as this technique does not take account of the actual pulse quotient of the signal, the application of this technique is less suitable to optical signals where the pulse quotient permanently or somewhat more temporarily differs from 50 percent because of the not-inconsiderable reduction of the receiver sensitivity which thereby occurs. The field of use for this technique is thereby to some extent limited.

In the magazine *Electronic Design* from Jun. 12, 1995, a circuit is described with a feedback loop intended for signal transmission on twisted cable pairs with high band width. The feedback loop adjusts the DC-level on an incoming electrical three-level signal, where the signal ideally attains three different voltage values lying symmetrically around zero volts. Through the integration of the difference signal between the DC-adjusted signal and a theorectic wave form, developed from this signal, a DC-component is achieved which can be added to the signal. In this way the DC-draft which tends to occur in certain applications for wide band data communication over twinned copper wire conductors is compensated for.

The circuit measures the size of the superimposed low-frequency voltage which can occur because of asymmetric data on the copper wire network and compensates for the possible base line shifting through in real time shifting the DC-level on the incoming signal back to its original level. In order to achieve a value for the size of the superimposed low frequency voltage in the received signal, the circuit forms a theoretic wave form of how the incoming signal probably would have looked if the superimposed voltage had not been present. This idea signal is compared to the incoming signal in order to detect the size of its offset voltage and to correct the same with the help of a built-in DC-level adjuster.

DISCLOSURE OF THE INVENTION

As mentioned above, in receivers for fibre optical signals it is, because of the low signal levels, problematic to achieve an exact offset compensation which is of great weight since the offset voltage often are much greater than the signal amplitudes. A further problem of a number of applications is that the voltage levels which lie in the middle of the high and low levels of the signals are different from the direct voltage level of the signal because of the pulse quotient differing from 50 percent, which means that the symbols with high and low levels appear with uneven frequencies in the signal.

The present invention solves these problems through providing a feedback loop for automatic compensation of the DC-level of the incoming signal. During the feed-back account is taken of the true pulse quotient of the transmitted signal through the direct current level of the input signal being related to the time average value of the output signal, which corresponds to the pulse quotient.

By letting the incoming signal be binarized with the help of a limiter, which acts as a decision circuit having the task of performing a subtraction between the signals on its two inputs and comparing the result with its decision threshold level and controlling its binary output signal in accordance with this relationship, it is possible, based on the binarized signal, to reform the theoretically most possible sent-signal sequences with known techniques through, e.g., date generation with the help of a phase-locked loop (PLL). In this way the receiver circuit's output signal is obtained. By calculating the time average value of this output signal, a value for the pulse quotient of the transmitted signal can be obtained.

The decision threshold level of the limiter is ideally equal to zero but because of the offset voltage this generally can not be achieved. The decision threshold level will therefore deviate from zero. For a correct relationship between the direct voltage level of the incoming signal and the decision threshold level of the limiter, the limited signal's time average value essentially must correspond to the pulse quotient of the transmitted signal, which corresponds to the time average value of the output signal, in such a way that the limiter gives a high level out during an equally large amount of time that the output signal has a high level. The output signal is therefore compared with the binarized signal and an integrated signal is formed, which corresponds to an integrated form of a difference signal generated by the above comparison between the output signal and the binarized signal. This integrated signal, which corresponds to the difference between the binarized signal's average value and the output signal's average value is subtracted from the incoming signal and adapts the direct voltage level on the input signal of the limiter in such a way that a negative feedback is obtained.

In this manner the direct voltage level on the signal which the limiter binarizes will be adapted so that the output signal of the limiter, the binarized signal, will attain a high level during essentially an equally large amount of time as the transmitted signal, irrespective of the offset voltage of the limiter and of a possible direct voltage level on the optical signal converted to electrical form.

The feedback loop can advantageously be made very slow in relation to the frequency of the optical signal as the offset voltage of the limiter, which is to be compensated for, changes extremely slowly.

The intention of the present invention is consequently for an optical receiver to obtain an exact offset compensation while taking account of the actual pulse quotient of the transmitted signal.

An advantage of the invention is that it can be made in its entirety as an integrated circuit without external capacitors.

The invention is intended for receivers of optical two-level signals with arbitrarily high band width. On account of its construction which offers low loss effects, it is extremely suitable for high band widths up to several giga bits per second.

The invention will be explained more closely below with the help of examples of embodiments with reference to the accompanying drawings.

PREFERRED EMBODIMENTS

Figure 1:
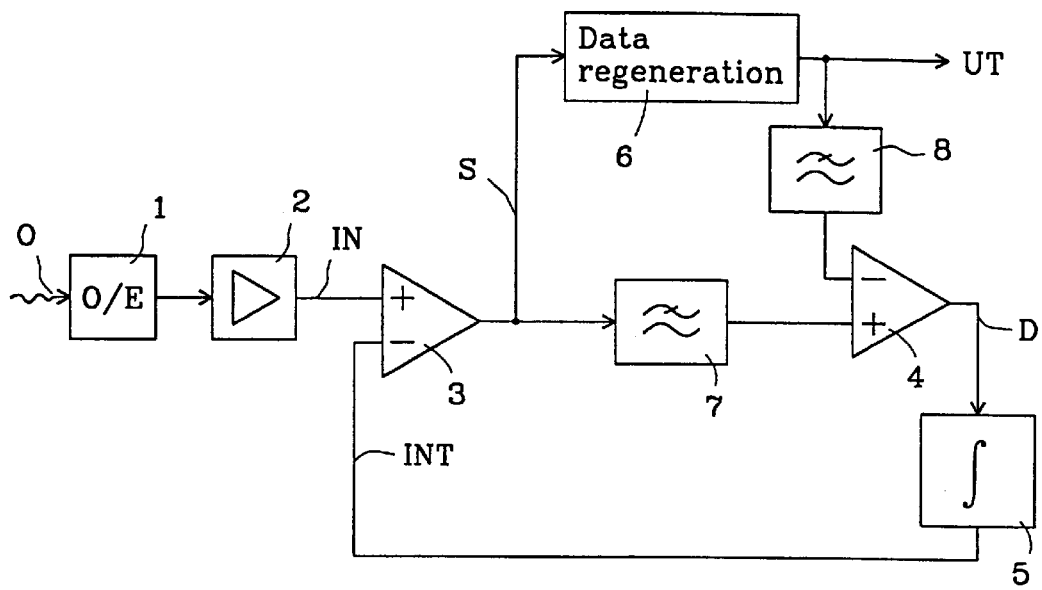
FIG. 1 shows a general block diagram of a fibre optic receiver according to the present invention.

FIG. 1 depicts a block diagram for a fibre optic receiver according to a basic embodiment of the present invention.

An optical signal O is detected with an opto electrical converter 1 which is built-up according to known techniques and consists of a PIN-diode or an avalanche-photo diode (APD) with peripheral components. The opto electrical converter is followed by an amplifier stage 2 which converts the diode current from the opto electrical converter into a corresponding electrical voltage. The amplifier stage 2 furthermore contains a certain filtering. The resulting electrical signal IN out of the amplifier stage is superimposed onto a direct voltage. This signal is binarized with the help of a limiter 3 which acts as a decision circuit having the task of subtracting its two input signals, the signal IN and a comparison signal INT, and comparing the result with its decision threshold level and thereafter controlling its output signal, the binarized signal S, so that it has a high or low level depending on the difference between the signals IN and INT being higher or lower than the decision threshold level. The decision threshold level is dependent on the offset voltage of the limiter.

The binarized signal S from the limiter 3 goes to a data regeneration circuit 6, in which the theoretically most likely signal sequence is regenerated with the help of a phase-locked loop (PLL) in a known manner. In this way the output signal UT is obtained, which has the same signal levels as the binary signal S. Naturally, instead of the phase-locked loop, some other known type of timing regeneration can be used.

The binarized signal S from the limiter 3 is filtered with a low-pass filter 7 which, in relation to the band width of the signal, has such a low cut-off frequency that its output signal substantially can be considered to be a time average value for the binarized signal S. In the same way the output signal UT is filtered with a low-pass filter 8 with an identical cut-off frequency to the low-pass filter 7.

These two filtered signals are compared by a difference signal former 4 which produces a difference signal D. The difference signal former functions in this way as a pure subtracter. The different signal D is integrated according to known techniques with an analogue integrator 5, the output signal of which, the comparison signal INT, goes into one of the two inputs of the limiter 3. In this way a loop with negative feeback is achieved.

The integrator 5 is accomplished using analogue techniques but the integration can naturally also be performed digitally. Several suitable techniques for this purpose have been presented. A conceivable advantage of digital integration is that the necessary capacitors can be made small, which is extremely suitable for integrated circuits.

With correct data regeneration the time average value of the output signal UT corresponds to the share of symbols with a high level in the transmitted signal. This share normally lies around fifty percent. With the correct choice of the limiter 3, the binarized signal S has an equally large share of high levels as the output signal UT. This is achieved through the integration of the difference signal D, which has the consequence that the comparison signal INT is adapted according to the average value of the difference signal. The comparison signal INT is subtracted from the signal IN+, IN− so that the direct voltage level on the signal resulting out of that is adapted to the decision threshold level of the limiter 33.

The negative feedback makes the comparison signal INT, the integrated signal, be adjusted in such a way that the time average value of the difference signal D goes towards zero. This means that the correct adjustment of the comparison signal INT for adaptation of the DC-level for the limiter is achieved with account taken for the real symbol content of the transmitted signal, i.e., the pulse quotient, and to the offset voltage of the limiter 3. Consequently, the circuit is responsible for the adaptation of the comparison signal to the input signal also when offset voltages and, should the occasion arise, the DC-level of the input signal are shifting.

As subtraction and integration are linear functions, it is equivalent to perform these in the opposite order. Consequently, it can be possible with an integrator device to integrate the binarized signal S and the output signal UT each by themselves and with a subtractor obtain a signal to feed back to the signal limiter 3.

In FIG. 1 all the function blocks are drawn with asymmetric inputs and outputs. It is, however, completely possible to make essentially all the signals after the amplifier stage 2 in symmetrical, i.e., differential, form. This is also evident from studying the example of an embodiment shown in FIG. 3.

the two low-pass filters 7 and 8 in FIG. 1 are identical. This is, however, not theoretically necessary, since only the average values of the signals are of interest. Low-pass filters can advantageously be used for simplifying the construction of the subsequent components as these in this case do not have to cope with equally high frequency components. The low-pass filters can, however, in principle be completely left out, which is evident from the subsequent example of an embodiment.

Figure 3:
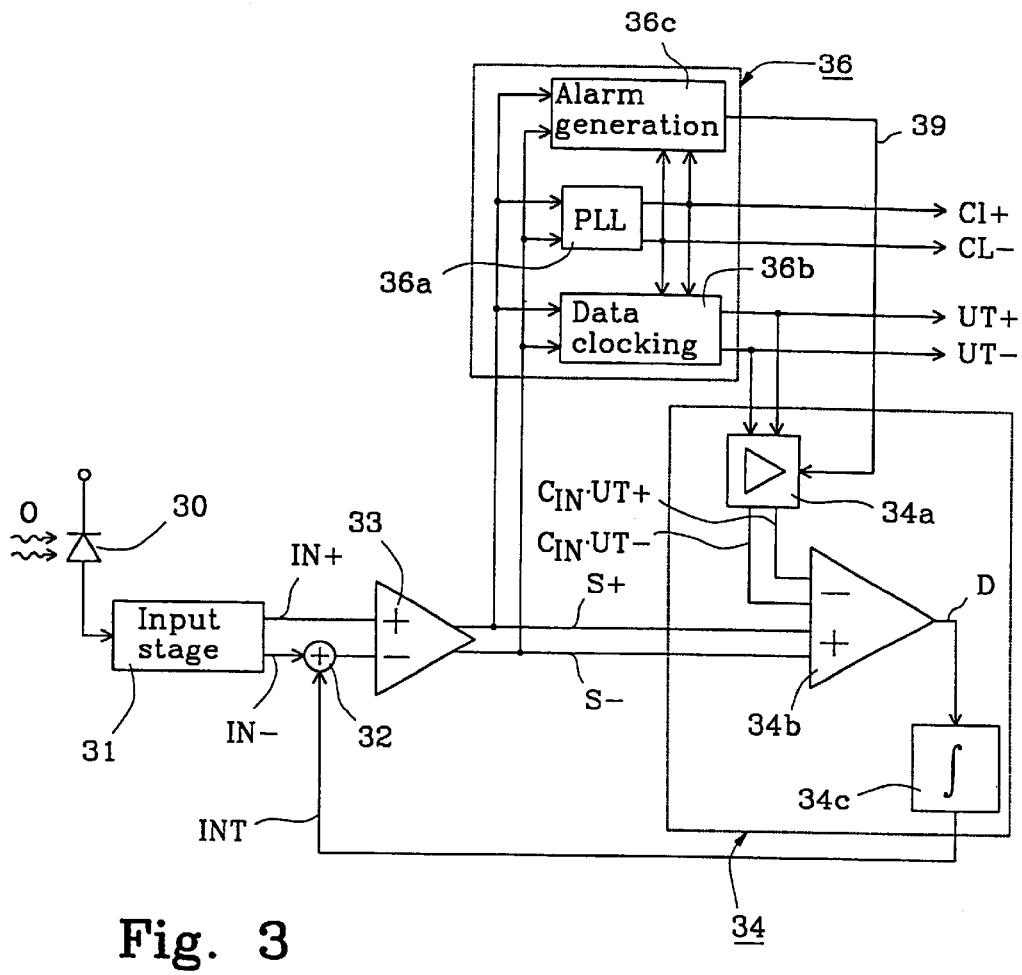
FIG. 3 represents a clear block diagram for a fibre optic receiver according to the present invention.

FIG. 3 shows a block diagram for a fibre optic receiver made according to an embodiment of the present invention. The optical signal O is converted to electrical form with the help of a PIN-diode 30 according to known technique. The signal is coupled via the input stage 31, which has symmetrical outputs IN+, IN− and contains some amplification, to a DC-level regulator 32 which adjusts the direct voltage level of the limiter 33 which binarizes the signal. A clock signal CL+, CL− is generated from the so obtained binarized signal S+, S−, using known technique with the help of a phase-locked loop 36a in the data regeneration circuit 36. With the help of the clock signal, the most probable transmitted signal series is reformed from the binarized signal in a data clock circuit 36b as the symmetrical output signal UT+, UT− in a known manner.

In analogy with the example of an embodiment in FIG. 1, a difference signal D is produced, which is integrated to a signal INT and fed back. In this example of an embodiment this takes place in the block 34. The output signal INT from this block 34 is connected to the DC-level regulator 32.

In certain cases it can be desirable, during the comparison between the binarized signal and the output signal, to let the first signal dominate somewhat over the latter. When starting up the receiver circuit, the comparison signal INT can be completely incorrect relative to the direct voltage level of the input signal IN+, IN−, so that the limiter 33 in extreme cases gives a constant output signal S+, S−, irrespective of the value of the input signal. Such a constant level of the binarized signal would with a realization of the invention as e.g. in FIG. 1, result in an likewise constant output signal. The consequence of this would be that the difference signal D would be constantly zero, whereby a balance is achieved and the comparison signal INT theoretically would lie still so that the DC-level error of the input signal would remain. In this way, the receiver could be locked in a position where all received symbols are the same.

In the example of a an embodiment in FIG. 3, the output signals UT+, UT− are attenuated with respect to the binarized signal S+, S− before the difference signal former 34b, which subtracts two differential signals and forms the difference signal D, which is integrated with the help of the integrator 34c. This attenuation takes place with the amplifier 34a and is indicated in the figures with a constant $C_{IN}$. By means of such a solution, with the help of the amplifier 34a, letting the binarized signal S+, S− dominate somewhat over the output signal UT+, UT−, the occurrence of the above described locking is prevented because equal signal levels in both of the input pairs to the block 34 in this case anyway implies a difference signal D which is different from zero. In this way, the comparison signal will let the input signal of the limiter 33 drift in towards a correct level.

In this example of an embodiment the amplifier 34a is controllable in such a way that the amplification $C_{IN}$, during the phase-in stage of the receiver before the feedback loop has adjusted itself, attains a value which is less than one, whereas in the normal working position after phasing-in of the receiver circuit, it is equal to one.

The binarized signal S+, S− from the limiter 33 and the clock signal Cl are connected to a circuit 36c, which produces an alarm on a synchronization alarm signal 39 in the case that the binarized signal and the clock signal are unsynchronized. Herewith, the amplification $C_{IN}$ in the amplifier 34a attains its lowest value until the phase-locked loop has regular flanks upon which it can lock. Thereby, the phasing-in criterion is fulfilled and the alarm on the synchronization alarm signal 39 is stopped. The amplification $C_{IN}$ in the amplifier 34a is raised to one and the feed-back can work under ideal conditions, i.e., with equally large priority for the binarized signal as for the output signal UT+, UT−.

A receiver circuit according to the invention can, as long as the clock signal is phased with the binarized signal S+, S−, work with very large variations for the pulse quotient for the transmitted signal. The timing regenerator, which in this example of the embodiment is constituted by the phase-locked loop 36a, can in principle also work with extremely large variations for the pulse quotient. However, that requires that flanks occur in the signal with a certain regularity. This requirement is, however, fulfilled according to known technique with suitable coding of the transmitted signal. This means that the timing regenerator can lock to the binarized signal as soon as pulses appear in the binarized signal.

The timing regenerator's ability to lock at the binarizeed signal S+, S− thus can be used as a criterion of whether the receiving circuit is working in the phasing-in state, in the case when the circuit has not phased in and the relevance of the output signal cannot be guaranteed, or in the normal working condition, when the circuit has phased in and the feedback loop works in accordance with the theory.

A more simple implementation of the receiver circuit is achieved if the amplification $C_{IN}$ in the amplifier 34a constantly attains a value less than one. In accordance with the disclosure above, the above described locking of the circuit is hereby prevented. Allowing the binarized signal S+, S− in this way to dominate over the output signal UT+, UT− even in the normal working condition when the feedback loop has phased in implies, however, for the cases when the pulse quotient of the transmitted signal deviates from fifty percent, that the sensitivity of the receiver is lowered somewhat in relation to the idea condition where the amplification $C_{IN}$ is equal to one.

Certain optical communication systems, such as fibre optical network versions of Token Ring or Ethernet, use besides the two normal signal levels an optical interruption. During such a interruption, the optical effect level should be extremely low, e.g., less than −40 dBm (dB related to 1 mW). The present invention uses only two signal levels. It is, however, fully possible to combine a feedback loop, as in the example of the embodiment in FIG. 3 with a detector for optical interruptions. Several such detectors are known. Depending on the type of detector, it can be placed so that it detects interruptions in the signal before the input stage 31, where the signal is represented by the current through the PIN-diode 30, or so that it detects interruptions by measuring the signal level of the signal IN+, IN− after the input stage 31.

At the detection of an optical interruption, the integration by integrator 34c is appropriately broken so that the signal INT retains its value during the interruption. In this way, the feedback loop after the optical interruption can begin to work from a probably suitable starting point for correct binarization of the signal.

The limiter 33 in FIG. 3 can, if so desired, be provided with hystereses. By such a use of hystereses for the change-over level for the limiter, so that the threshold value for changing over from high to low level differs somewhat from the threshold value for changing over from low to high level, false flanks, produced by noise, in the binarized signal S+, S− can be counteracted.

Figure 2:
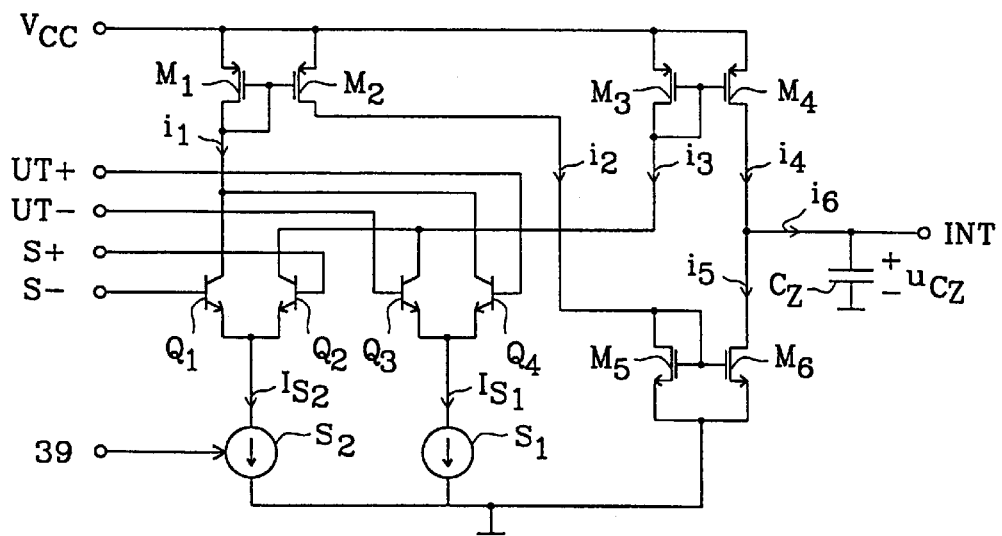
FIG. 2 shows an electronic circuit diagram for a detail of an alternative embodiment in relation to the example shown in FIG. 3.

FIG. 2 shows a method for the realization of the functionality of the block 34 in FIG. 3. The binarized signal S+ and S− from the limiter 33 equipped with differential outputs in FIG. 3 goes in to two bipolar transistors $Q_2$ and $Q_1$, which form a differential amplifier stage. This differential amplifier stage is provided with current by a current source $S_2$. At the signal levels which apply in use, the differential amplifier stage is over-excited so much that it basically functions as a current switch for the current through the current source $S_2$. In the same way, the output signal UT+ and UT− from the data regeneration circuit 36 is coupled into two bipolar transistors $Q_4$ and $Q_3$ acting like current switches which control the current through a current source $S_1$.

The collectors belonging to the transistors $Q_1$ and $Q_4$ are joined and connected to a current mirror which is built up of two PMOS-transistors $M_1$ and $M_2$ in a known manner. The drains of these transistors are coupled to a supply voltage $V_{CC}$ while their respective gates are coupled together. Since the transistors in this way will have the same voltage over gate and drain, the current through $M_2$, with the reference numeral $i_2$, will be equally large as the current through $M_1$, designated $i_1$, which is the sum of the currents through $Q_1$ and $Q_4$. In an equivalent way, the current $i_2$ is reflected in a current mirror built-up of two NMOS-transistors $M_5$ and $M_6$. A current $i_5$ through the transistor $M_6$ thereby corresponds to the current $i_2$ through the transistor $M_5$, which in turn has the same value as the current $i_1$.

In a corresponding way the collectors belonging to the transistors $Q_1$ and $Q_2$ are joined together and connected to a current mirror build up of two PMOS-transistors $M_3$ and $M_4$. In the same way as described above, it therefore follows that a current $i_4$ attains the same value as the current $i_3$.

The sources on the transistors $M_4$ and $M_6$ are both joined together to the output of the block 34. A capacitor $C_Z$ lies between the output and signal earth. As the current through the output can be ignored, the current $i_6$ through the capacitor will be equal to the difference between the currents $i_4$ and $i_5$, which implies the following relationship:

$$u_{C_Z} = u_0 + \frac{1}{C_Z}\int_{t_0}^{t}(i_4 - i_5)dt = u_0 + \frac{1}{C_Z}\int_{t_0}^{t}(i_3 - i_1)dt.$$

Here $u_{C_Z}$ means the voltage over the capacitor $C_Z$ as a function of the time t, and $u_0$ the voltage over the capacitor $C_Z$ at a time point $t_0$.

The current $i_3$ is the sum of the current through the transistor $Q_2$ and the current through the transistor $Q_3$. The average value of the current through $Q_2$ is equal to the share, in the following designated $k_S$, of the time during which the binarized signal S+, S− in average is at a high level, multiplied by a current $I_{S2}$ through the current source $S_2$. In the same way, the average value of the current through $Q_3$ is equal to the time share under which the output signal UT+, UT− is at a low level, multiplied by a current $I_{S1}$ through the current source $S_1$. If the time share for high level in the output signal is designated $k_{UT}$, this means for and average value $\hat{i}_3$ of the current $i_3$:

$\hat{i}_3 = k_S \cdot I_{S2} + (1-k_{UT}) \cdot I_{S1}.$

The average value $\hat{i}_1$ of the current $i_1$ will be in the same way:

$\hat{i}_1 = k_{UT} \cdot I_{S1} + (1-k_S) \cdot I_{S2}.$

From that it follows that:

$$\hat{i}_6 = (2 \cdot k_S - 1) \cdot I_{S2} - (2 \cdot k_{UT} - 1) \cdot I_{S1}.$$

If then the current $I_{S1}$ is the same size as $I_{S2}$, then the value $\hat{i}_6$, the average value of the current $i_6$, will be proportional to $k_S - k_{UT}$, i.e. the difference of the share of high level in the average of the binarized signal S+, S− and of the output signal UT+, UT−.

If these two time shares correspond, i.e., if the signals S+, S− and UT+, UT− in the average have high level during an equally large share of the time, the value $\hat{i}_6$ will become zero and the voltage $u_{C2}$, which corresponds to the signal INT, will not change because the charge of the capacitor is unchanged. On the other hand, if the binarized signal attains a high level during a larger share of the time than the output signal, the value $\hat{i}_6$ will become positive, which means that the charge on the capacitor increases and INT is raised. This implies in turn that the input signal to the limiter 33 is lowered and the binarized signal will attain a high level during a somewhat smaller share of the time. In this way, the feedback loop will be adjusted so that the signals S+, S− and UT+, UT− in average will attain a high level during an equally large part of the time.

If, on the other hand, the current $I_{S2}$ is greater than the current $I_{S1}$, then the time share of high levels in the binarized signal S+, S− will dominate in the above expression in relation to the output signal UT+, UT−. This corresponds to the relationship with coupled-in attenuation in the amplifier 34a in FIG. 3. Equally large shares of high levels in the two signals will then imply a positive value for the average value $\hat{i}_6$ of the current $i_6$. Thereby, in this case, the comparison signal INT will be raised and the feedback loop will tend to be adjusted to a balance where the binarized signal attains a high level during a somewhat longer time share than the output signal UT+, UT−. By letting the signal 39 from the phase-locked loop 36a in FIG. 2 control the current source $S_2$, the binarized signal S+, S− can be given a priority with respect to the output signal UT+, UT− during the phasing-in state of the receiver. In this way, a balance can be prevented from being achieved for constant levels on the binarized signal and the output signal.

When the phase-locked loop 36a finds flanks that it can lock on to, the binarized signal S+, S− obviously is not keeping a constant level. The feedback can in this case be allowed to work under idea conditions, i.e., at equally large priorities for the binarized signal as for the output signal UT+, UT−.

Figure 4:
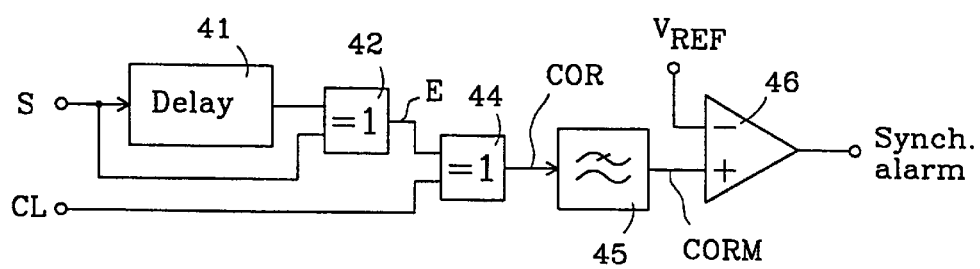
In FIG. 4, a block diagram for a detail of the example of an embodiment shown in FIG. 3 is depicted.
Figure 5:
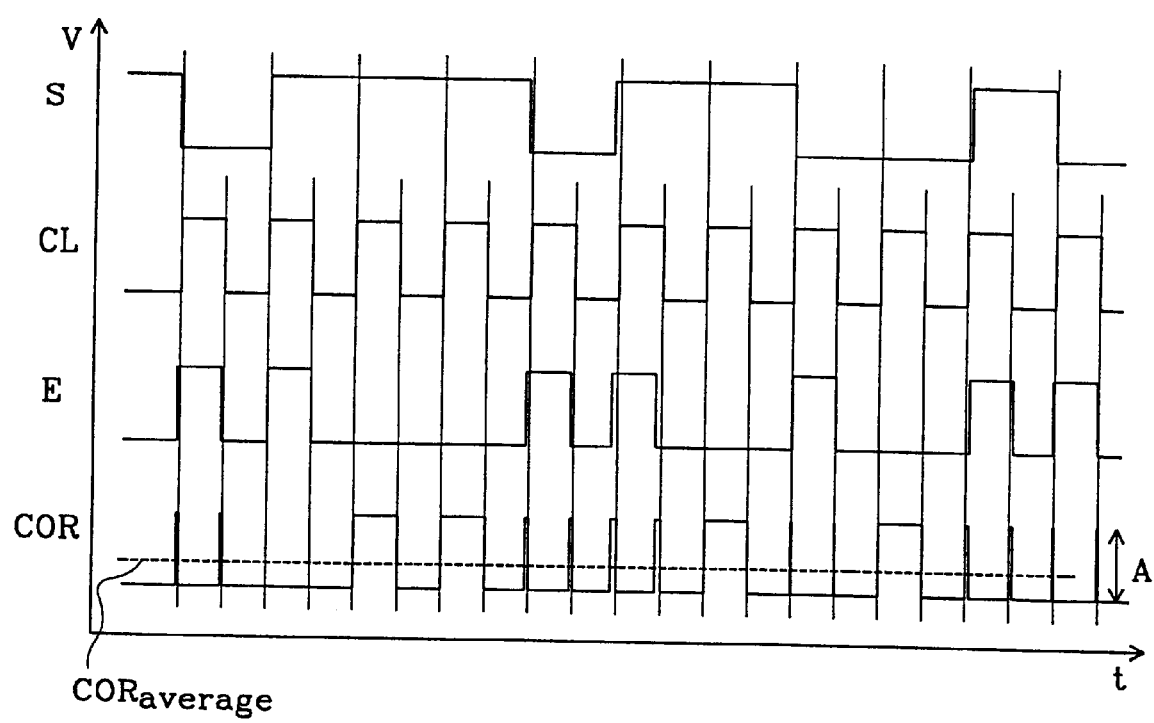
FIG. 5 shows a signal diagram of an example of the signal flow for the example of an embodiment depicted in FIG. 4.

FIG. 4, which shows the synchronization alarm generator 36c of FIG. 3, illustrates together with the signal diagram in FIG. 5, which shows an example of signal flows for the mentioned signals, the production of the synchronization alarm signal, which as described above regulates the relationship between the binarized signal S+, S− and the output signal UT+, UT− during the formation of the difference signal D. In these FIGS. 4 and 5, all the signals are given as asymmetric signals. It is still completely equivalent for the function to use differential signals. In the following description, the signals in FIGS. 4 and 5 can therefore be considered to represent either asymmetric or differential signals.

The binarized signal S is delayed a half clock period with the help of a delay unit 41, whereafter this delayed signal and the non-delayed signal S are each fed to an input of an exclusive OR-gate 42, which realizes the function addition modulus 2. From the exclusive OR-gate 42, a flank pulse signal E is obtained with an equally large pulse width as the clock signal CL has. The flank pulse signal E is fed together with the clock signal to an exclusive OR-gate 44, from which a signal COR is obtained. This is filtered with a low-pass filter 45, which in relation to the clock signal CL has such a low cut-off frequency that the output signal CORM of the filter 45 in the main is to be considered as the time average value $COR_{average}$ of the signal COR. The voltage level of the time average value $COR_{average}$ in relation to the signal COR is given in FIG. 5. The signal CORM is compared with the help of a decision circuit 46 with a reference voltage $V_{REF}$. The decision circuit 46 can consist of a simple comparator which forms the synchronization alarm signal which in FIG. 3 has the reference numeral 39. This alarm signal, which is active high, has a high signal level when the voltage of the signal CORM from the low-pass filter 45 exceeds the reference voltage $V_{REF}$ and a low signal level when it is below it.

FIG. 5 shows more closely the signals S, CL, E, COR and $COR_{average}$ in a diagram with time t on the abscissa and a voltage V on the ordinate. When the clock signal Cl is perfectly phased-in with the binarized signal S, the pulses in the signal E basically correspond to the pulses in the clock signal. The transmitted signal in this example has the characteristic that it in average has 0,5 signal level passes per clock period. This means that the minimum average level of the signal COR seen over a long time period is 0,25·A. As is evident from FIG. 5, A thereby represents the peak-to-peak value of the signal COR.

Because there is an uncertainty in the position of the flanks of the binarized signal S, the pulses in the signals E and CL even with perfect synchronization seldom correspond exactly. Therewith, the average value $COR_{average}$ on COR will be somewhat higher than the above stated value.

If, on the other hand, the binarized signal S and the clock signal CL are completely uncorrelated with each other, it is easy to see that the average value $COR_{average}$ of the signal will be equal to 0,5·A. For an adequate determination of whether the timing regenerator is locked on the binarized signal and the clock signal CL thereby synchronised with the transmitted signal, the reference voltage $V_{REF}$ should consequently lie at a suitable level between 0,25·A and 0,5·A.

Figure 6:
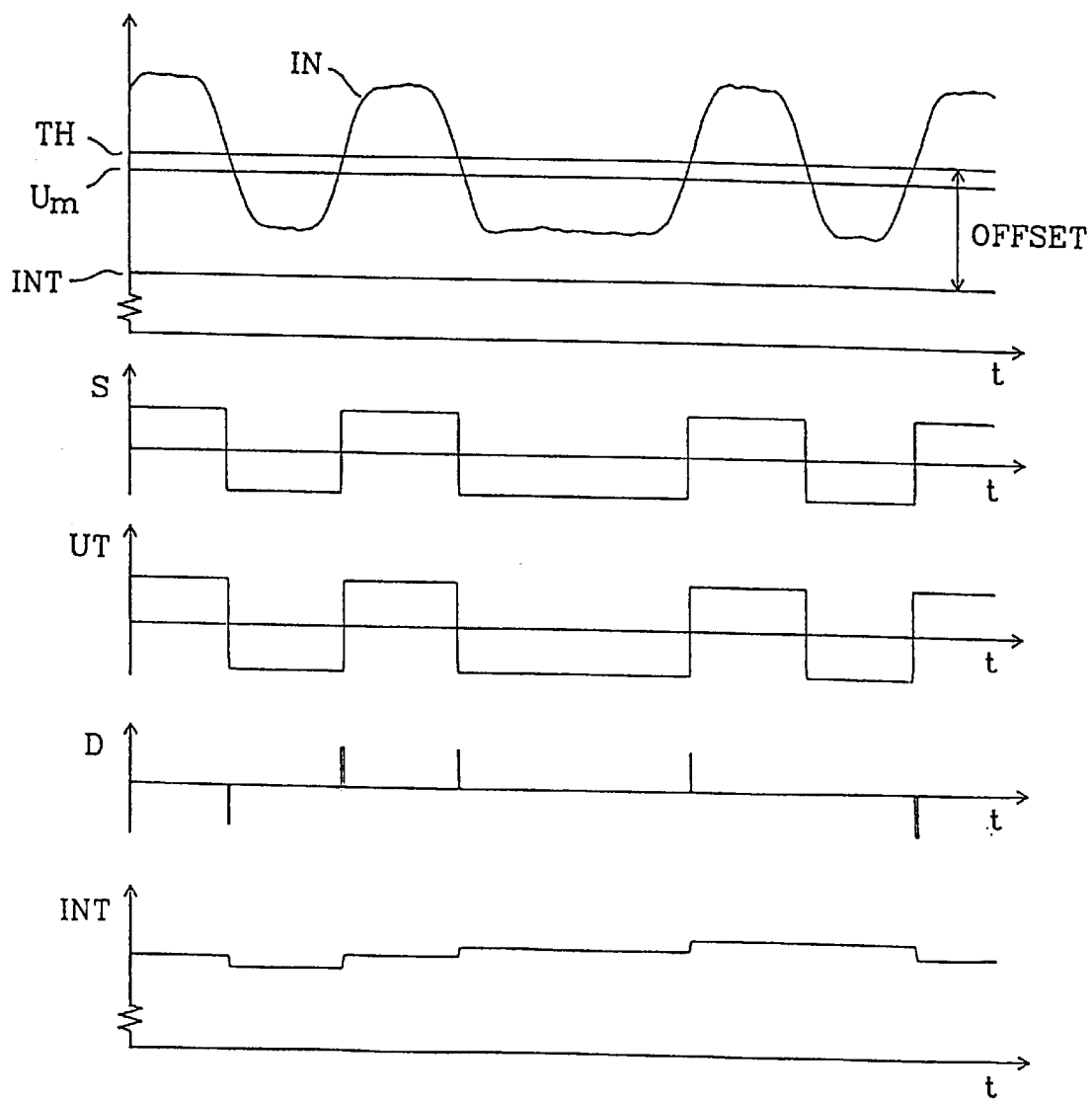
FIG. 6 shows a signal diagram of an example of the signal flow for the example of embodiment depicted in FIG. 3.

In FIG. 6 the example of the embodiment in FIG. 3 is illustrated with a signal diagram which shows an example of signals. The differential signals represented in FIG. 3 are herein represented with signals in relation to earth. The IN-signal is consequently equal to IN+ minus IN−. The same is valid for the reference numerals of the rest of the signals presented here, which in FIG. 3 are given as differentials.

Upmost in the Figure there are illustrated the input signal IN converted to electrical form and the direct voltage level $U_m$ on which this signal is superimposed. In the same diagram the signal INT is also given. This is substracted from the signal IN before binarization in the limiter with number 33 in FIG. 3. The limiter subtracts the signal level on its negative input from the signal level on its positive input and lets the result control the so binarized signal S in such a way that the limiter gives out a high level if this result is greater than its decision threshold level, and a low level if the result is less than the decision threshold level.

For better clarity, so that the change-over time point of the limiter appears, the voltage level TH on the decision threshold level of the limiter is also shown in relation to the IN-signal. This state corresponds to the true decision threshold level plus the signal INT. With an idea signal limiter the decision threshold level would be zero and the signal INT correspond to the voltage level TH. The discrepancy shown in the diagram between the signal INT and the voltage level TH is to be attributed to the offset voltage of the limiter.

The binarized signal S from the limiter and the output signal UT are also shown in the FIG. The output signal is taken from the data regeneration circuit 36 in FIG. 3 by determining a most probable signal level in each clock pulse period.

The difference signal D is here directly proportional to the difference between the signal S and the signal UT. The amplification $C_{IN}$ in the amplifier 34a is consequently equal to the value one in this example. The signal INT obtained by integration of the difference signal D, which is shown upmost in the Figure, is also shown at the bottom in the same FIG. 6. In order to emphasize the character of the signal, it is not, however, shown in the same scale as above in the Figure.

In this description of the signal diagram this is provided with references to FIG. 3. However, the references could be equally valid for FIG. 1, if the low-pass filters 7 and 8, which are not necessary for the function of the circuit, were left out.

What is claimed is:

1. Method for regenerating a transmitted signal sequence in a fibre optic receiver from an incoming signal (O), wherein:
    a comparison signal (INT) is subtracted from an electrical signal (IN) corresponding to the incoming signal;
    a binarized signal (S) is produced out of the signal obtained by the subtraction, and
    an output signal (UT) corresponding to an estimation of the transmitted signal sequence is generated out of the binarized signal (S);
    characterized in that the comparison signal (INT) is generated, corresponding to an integrated difference signal, based on the binarized signal and the output signal.

2. Method for regenerating a transmitted signal sequence in a fibre optic receiver out of an incoming signal (O) according to claim 1, characterized in that the comparison signal (INT) is generated through integration of a difference signal (D), which is formed through the output signal (UT) multiplied by a constant ($C_{IN}$) subtracted from the binarized signal (S), where the constant is less than or approximately equal to the value one.

3. Method for regenerating a transmitted signal sequence in a fibre optic receiver out of an incoming signal (O) according to claim 2, wherein during a phasing-in state of the receiver the binarized signal (S) lacks detectable flanks, characterized in that said constant ($C_{IN}$) in the phasing-in state is greater than or equal to the value zero, whereas the constant normally is greater than the value zero.

4. Method for regenerating a transmitted signal sequence in a fibre optic receiver out of an incoming signal (O) according to claim 1, characterized in that the comparison signal (D) is generated through integration of a difference signal (D), which is formed through the output signal (UT) being subtracted from the binarized signal (S).

5. Method for regenerating a transmitted signal sequence in a fibre optic receiver out of an incoming signal (O) according to claim 2, wherein during a phasing-in state of the receiver the binarized signal (S) lacks detectable flanks, characterized in that the value of above said constant ($C_{IN}$) varies in such a way that the constant in the phasing-in state is made to attain a first value whereas the constant in general is made to attain another value.

6. Method for regenerating a transmitted signal sequence in a fibre optic receiver out of an incoming signal (O) according to claim 5, characterized in that said first value of the constant ($C_{IN}$) is lower than said second value.

7. Method for regenerating a transmitted signal sequence in a fibre optic receiver out of an incoming signal (O) according to claims 5, characterized in that said second value of the constant ($C_{IN}$) is approximately equal to one.

8. Method for regenerating a transmitted signal sequence in a fibre optic receiver out of an incoming signal (O) according to claim 3, wherein a timing reference (36a) is used for producing a clock signal (CL) synchronous with the binarized signal (S), characterized in that as a decision criterion for the phasing-in state, the timing regenerator's (36a) ability to lock on the binarized signal (S) is used in such a way that the phasing-in state is present when the timing regenerator is incapable of locking onto the binarized signal.

9. Method for regenerating a transmitted signal sequence in a fibre optic receiver out of an incoming signal (O) according to claim 2, characterized in that the constant ($C_{IN}$) is greater than the value zero.

10. Method for regenerating a transmitted signal sequence in a fibre optic receiver out of an incoming signal (O) according to claim 1, characterized in that the binarized signal is produced through binarization by means of a limiter (3, 33).

11. Method for regenerating a transmitted signal sequence in a fibre optic receiver out of an incoming signal (O) according to claim 10, characterized in that the limiter (3, 33) works with hystereses so that the decision threshold level of the limiter relative to the input signal of the same limiter lies somewhat lower at a high level on the binarized signal (S) than what the same decision threshold level does at a low level on the binarized signal.

12. Method for regenerating a transmitted signal sequence in a fibre optic receiver out of an incoming signal (O) according to claim 1, characterized in that the transmitted signal only has information at two levels.

13. Method for regenerating a transmitted signal sequence in a fibre optic receiver out of an incoming signal (O) according to claim 1, characterized in that a periodic clock signal (CL) is extracted out of the binarized signal (S), and the output signal (UT) is obtained from the binarized signal through determination of a most probable binary signal level in the respective corresponding period of the clock signal (CL).

14. Method for regenerating a transmitted signal sequence in a fibre optic receiver out of an incoming signal (O) according to claim 13, characterized in that the clock signal (CL) is extracted out of the binarized signal (S) by means of a phase-locked loop (36a).

15. Arrangement in a fibre optic receiver for reproducing a transmitted signal sequence from an incoming optical signal (O), which arrangement comprises:
    on the one hand, a limiter (3, 33) which on its inputs receives an electrical input signal (IN) corresponding to a converted form of the optical signal (O) and a comparison signal (INT) and on its output is arranged to emit a binarized signal (S) which corresponds to a first difference signal, generated based on the electrical input signal (IN) and the comparison signal, and
    on the other hand, a data regeneration circuit (6, 36) connected to the limiter, arranged to generate an estimate of the transmitted signal sequence;
    characterized in that the arrangement comprises a difference signal former (4, 34b) and an integrator device (5, 34c), which generate the comparison signal (INT) which corresponds to an integrated second difference signal, formed based on the binarized signal (S) and the output signal (UT).

16. Arrangement in a fibre optic receiver for reproducing a transmitted signal sequence from an incoming optical signal (O) according to claim 15, characterized in that the difference signal former (4, 34b) has inputs which are connected to the limiter (3, 33) and the data regeneration circuit (6, 36) and an output connected to the integrator device (5, 34c), of which the output is connected to one of the inputs of the limiter (3), whereby the difference signal former (4, 34b) is arranged to gene-rate a difference signal (D) corresponding to the binarized signal (S) and the output signal (UT), and the integrator device (5, 34c) generates the comparison signal (INT) through integration of the difference signal (D).

17. Arrangement in a fibre optic receiver for reproducing a transmitted signal sequence from an incoming optical signal (O) according to claim 16, characterized in that the arrangement comprises an amplifier (34a), of which the input is connected to the data regeneration circuit (36) and of which the output is connected to the difference signal former (34b), whereby the amplification ($C_{IN}$) of the amplifier (34a) is less than or approximately equal to the value one.

18. Arrangement in a fibre optic receiver for reproducing a transmitted signal sequence from an incoming optical signal (O) according to claim 16, wherein, during a phasing-in state for the receiver, the binarized signal (S) lacks detectable flanks, characterized in that the amplifier (34a) is arranged in such a way that the amplification ($C_{IN}$) in the phasing-in state is greater than or equal to the value zero, whereas the constant generally is greater than the value zero.

19. Arrangement in a fibre optic receiver for reproducing a transmitted signal sequence from an incoming optical signal (O) according to claim 17, wherein, during a phasing-in state for the receiver, the binarized signal (S) lacks detectable flanks, characterized in that the amplifier (34a) is arranged in such a way that its above said amplification ($C_{IN}$) value varies in such a way that the amplification in the phasing-in state is induced to attain a first value, whereas the amplification otherwise is induced to attain a second value.

20. Arrangement in a fibre optic receiver for reproducing a transmitted signal sequence from an incoming optical signal (O) according to claim 19, characterized in that the amplifier (34a) is arranged in such a way that said first value of the amplification ($C_{IN}$) is lower than said second value.

21. Arrangement in a fibre optic receiver for reproducing a transmitted signal sequence from an incoming optical signal (O) according to claim 19, characterized in that the amplifier (34a) is arranged in such a way that said second value of the amplification ($C_{IN}$) is approximately equal to one.

22. Arrangement in a fibre optic receiver for reproducing a transmitted signal sequence from an incoming optical signal (O) according to claim 18, comprising a timing regenerator (36a) which is arranged to produce a clock signal (CL) synchronous with the binarized signal (S), characterized in that, as decision criterion for the phasing-in state, the ability of the timing regenerator (36a) to lock onto the binarized signal (S) is applied.

23. Arrangement in a fibre optic receiver for reproducing a transmitted signal sequence from an incoming optical signal (O) according to any of claim 17, characterized in that the amplifier (34a) is arranged in such a way that the amplification ($C_{IN}$) is greater than the value zero.

24. Arrangement in a fibre optic receiver for reproducing a transmitted signal sequence from an incoming optical signal (O) according to claim 15, characterized in that the limiter (3, 33) works with hystereses so that the decision threshold level of the limiter relative to the input signal of the same limiter is lower at a high level on the binarized signal (S) than what the same decision threshold level is at during a low level on the binarized signal.

25. Arrangement in a fibre optic receiver for reproducing a transmitted signal sequence from an incoming optical signal (O) according to claim 15, characterized in that the arrangement in its entirety is an integrated circuit, on which all of the necessary capacitances for the arrangement are carried out.

26. Arrangement in a fibre optic receiver for reproducing a transmitted signal sequence from an incoming optical signal (O) according to claim 15, characterized in that the arrangement comprises a timing regeneration (36a), of which the input is connected to the limiter (33), and a data clock circuit (36b), of which the two inputs are connected to the limiter (33) and the timing regenerator (36a) respectively, wherein the timing regenerator (36a) is arranged to extract a clock signal (CL) out of the binarized signal (S), and the data clock circuit (36b) is arranged to generate the output signal (UT) through determination of the most probable binary signal level in the respective corresponding period of the clock signal (CL).

27. Arrangement in a fibre optic receiver for reproducing a transmitted signal sequence from an incoming optical signal (O) according to claim 26, characterized in that the timing regenerator comprises a phase-locked loop (36a).

28. Arrangement in a fibre optic receiver for reproducing a transmitted signal sequence from an incoming signal (O) according to any of claim 15, characterized in that the arrangement is established to detect an incoming signal with essentially only two logical levels.

* * * * *